United States Patent [19]

Griesemer

[11] Patent Number: 5,427,444

[45] Date of Patent: Jun. 27, 1995

[54] BI-DIRECTIONAL MOTION SENSOR FOR MOBILE STORAGE SYSTEMS

[75] Inventor: Patrick J. Griesemer, Greenfield, Wis.

[73] Assignee: Spacesaver Corporation, Fort Atkinson, Wis.

[21] Appl. No.: 74,437

[22] Filed: Jun. 9, 1993

[51] Int. Cl.⁶ ............................................. A47B 53/00
[52] U.S. Cl. ..................................... 312/201; 312/198
[58] Field of Search .................... 312/201, 198; 49/25, 49/28

[56] References Cited

U.S. PATENT DOCUMENTS

| 4,029,176 | 6/1977 | Mills | 49/25 |
|---|---|---|---|
| 4,119,376 | 10/1978 | Moyer | 312/199 |
| 4,693,184 | 9/1987 | Peterman . | |
| 4,733,923 | 3/1988 | Dahnert . | |
| 4,743,078 | 5/1988 | Dahnert . | |
| 4,744,307 | 5/1988 | Peterman et al. . | |
| 4,745,516 | 5/1988 | Griffin . | |
| 5,121,975 | 6/1992 | Dahnert . | |
| 5,160,190 | 11/1992 | Farrell et al. | 312/201 |

Primary Examiner—Kenneth J. Dorner
Assistant Examiner—Gerald A. Anderson
Attorney, Agent, or Firm—Ryan, Kees & Hohenfeldt

[57] ABSTRACT

A directional detector for use with a mobile storage system including at least a first movable storage unit with a prime mover adapted to move the shelving unit along a path of movement, and at least one blocking object, such as a second movable storage unit, a stationary storage unit or a wall, positioned on the path, there being an aisle formed therebetween. The directional detector detects the entry of an obstacle into the aisle and prevents movement of the first unit until the obstacle is detected to have left the aisle. The detector includes two light source-detector pairs, the source and detector of each pair mounted to each of the first unit and the blocking object on opposite sides of the aisle, and facing each other. A control unit is connected to the light detectors of the pairs and receives signals therefrom, indicating whether or not the detectors are receiving light from the sources. The control unit uses this information to determine the direction the obstacle moved, either into or out of the aisle. The prime mover is disabled from moving the first storage unit along the path until the obstacle is detected to have left the aisle. In-aisle light sources and detectors may also be provided, for the instances when several obstacles enter the aisle at the same time and leave individually.

19 Claims, 2 Drawing Sheets

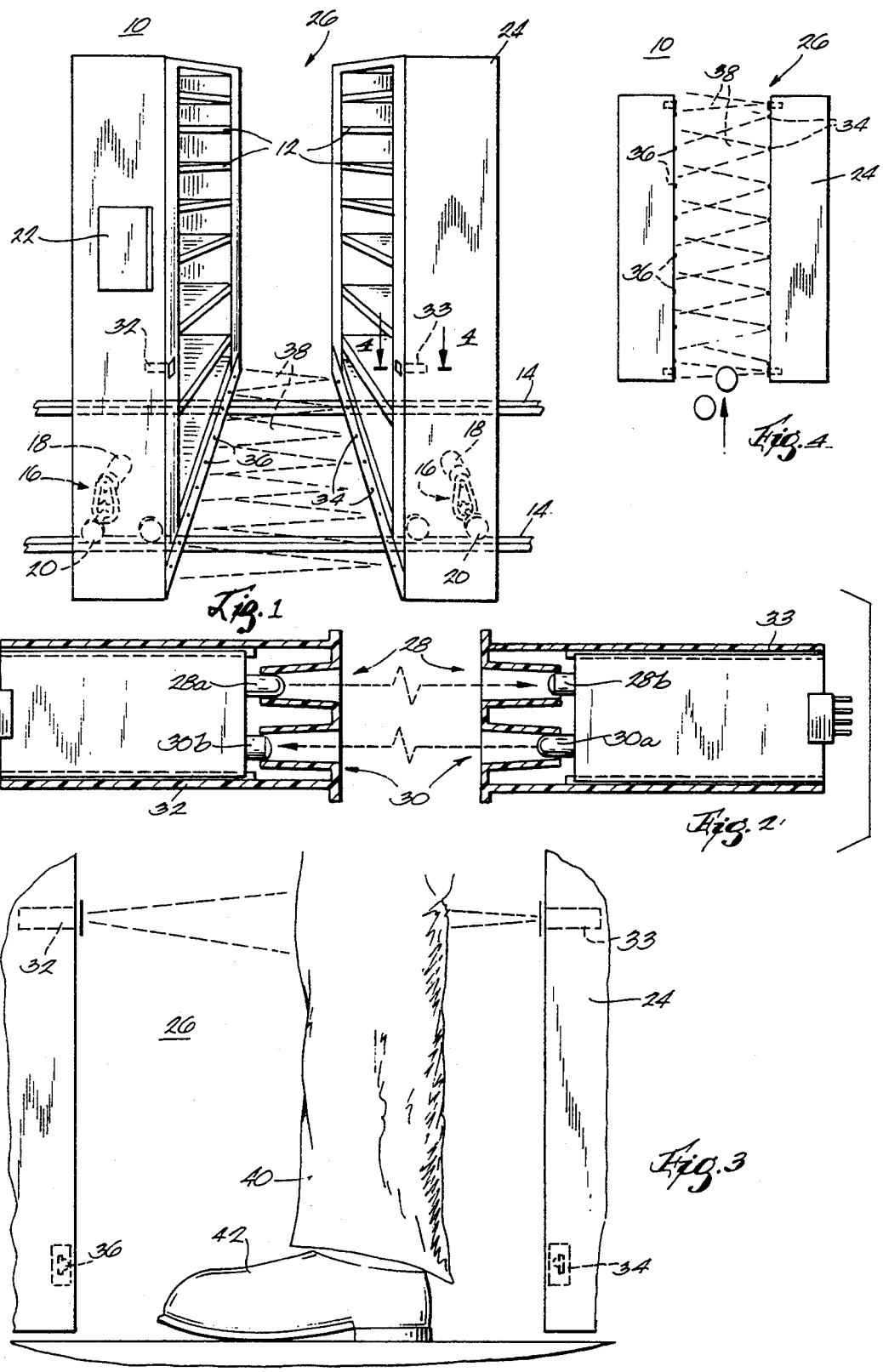

BI-DIRECTIONAL MOTION SENSOR FOR MOBILE STORAGE SYSTEMS

BACKGROUND OF THE INVENTION

This invention relates to mobile storage systems, and in particular to mobile storage systems having sensors to prevent the closure of an aisle between two storage units when an obstacle is present in the aisle, without the need for physical contact with the obstacle.

Mobile storage systems are widely used and well known to comprise a series of storage units which have shelves or bins, for example. Except for one or both of the end units, which may be stationary, each of the storage units will normally be movable, such as on rails, to create an access aisle between two of the units. As this aisle opens, the other units are positioned in close side-by-side relationship to minimize the overall floor space required for the units, moving together to do so. Especially in larger mobile storage units and systems, the carriages can be quite large, and the loads they carry quite heavy, such as steel or construction materials. It is commonly necessary, therefore, to provide motorized means for moving the units. These motorized moving means in turn require the use of means for preventing adjacent units from moving together when an obstacle, such as a person, is positioned between them, so as to avoid injury or damage.

In the past it has been customary to provide a sweep or safety switch bar for notifying the control system to inhibit motion of a storage unit if the bar encounters, while moving to close the aisle, an obstacle or impediment to movement, as shown for instance in U.S. Pat. Nos. 4,743,078 and 4,733,923. When such a structure is used alone to protect a person, however, the requirement of physical contact with the bar can be disconcerting and startling, which can make use of this structure alone undesirable. Use of a photoelectric sweep, as disclosed in U.S. Pat. No. 5,121,975, is only slightly less disconcerting, as the moving storage unit must still move quite close to a person before its motion is interrupted.

Another alternative is to use a "safety floor" such as set forth in U.S. Pat. Nos 4,744,307 and 4,693,184, which disclose constructions of floor panels including safety switches. The weight of a person or other obstacle on one of the floor panels activates one of the safety switches, which notifies the control system to inhibit movement of the storage units. While these units work very well from a safety standpoint, they can be rather expensive, resulting in their non-use in certain situations. And U.S. Pat. No. 4,745,516 even discloses the use of a safety sweep and a safety floor in combination. Even this combination, however, may not properly sense that an obstacle remains in the aisle even though no switches are closed, such as on occasion may occur when a very light obstacle is in the aisle, or when a person needs to reach an item on a high shelf and may step onto a lower shelf to reach the item.

This invention relates to improvements to the structure set forth above, and to solutions to some of the problems raised or not solved thereby.

SUMMARY OF THE INVENTION

The present invention relates to a mobile storage system including at least a first movable storage unit with a prime mover adapted to move the shelving unit along a path of movement, and at least one blocking object, such as a second movable storage unit, a stationary storage unit or a wall positioned on the path. Generally the path between the movable shelving unit and the blocking object can be termed an aisle, open at one or both ends. The invention provides a detector for detecting the entry of an obstacle into the aisle and for preventing movement of the first unit while the obstacle is in the aisle. When the obstacle leaves the aisle, the movement of the first unit is again enabled.

According to the invention, the detector includes at least two light source-detector pairs, each pair including a light source and a light detector. Of each pair, the source is mounted to either the first unit or the blocking object, and the detector is mounted to the blocking object or first unit, respectively, opposite the source. That is, at least two light sources direct beams across the entry-exit point of the aisle, and opposite each source is positioned a corresponding detector. A control unit is connected to the light detectors and receives a signal from the light detectors, that signal indicating whether or not the light detectors are receiving light from the light sources. The two sources are offset substantially horizontally. The control unit disables the prime mover from moving the first unit along the path when it is determined that an obstacle, such as a person for instance, has entered the aisle and has not exited.

One embodiment includes a number of sets of source-detector pairs, mounted in at least two columns, to the movable unit and the blocking object. This embodiment provides improved directional detection of the obstacle or person into and out of the aisle.

Another embodiment includes in addition a plurality of in-aisle light sources and detectors located in the aisle and spaced along the length of the aisle, and the control unit includes obstacle locating means for determining which of those in-aisle light detectors if any is not receiving light from a light source, once the source-detector pairs have sensed that an obstacle has entered the aisle. The fact that one of the in-aisle light detectors is not receiving light indicates that the obstacle is still in the aisle, so that the control unit refuses to permit the aisle to close when the obstacle is still there. The in-aisle detector and source are most advantageously mounted substantially at the bottom of the first unit and the blocking object. According to the invention, the obstacle locating means uses the information about which of the in-aisle detectors is not receiving light to determine where along the aisle the detectors are not receiving light from the light sources. This information is useful to continue the disablement of the prime mover, even though the entry-exit source-detector pair has determined that an obstacle has left the aisle, in cases where more than one person or obstacle had entered the aisle substantially simultaneously.

Other objects and advantages of the invention will become apparent hereinafter.

DESCRIPTION OF THE DRAWING

FIG. 1 is a perspective view of a mobile storage system including a directional detector constructed according to a preferred embodiment of the invention.

FIG. 2 is a top cross sectional view of FIG. 1, taken substantially along line 2—2 thereof, showing two entry-exit source-detector pairs according to the invention in more detail.

FIG. 3 is a side elevation view of a portion of the mobile storage system shown in FIG. 1, showing a person entering the aisle, with the person's leg acting as an obstacle to the light from the entry-exit sources.

FIG. 4 is a top view of the mobile storage system shown in FIG. 1, again showing a person's legs entering the aisle and acting as an obstacle to the light from the entry-exit sources.

DESCRIPTION OF THE PREFERRED EMBODIMENT

Figure 5:
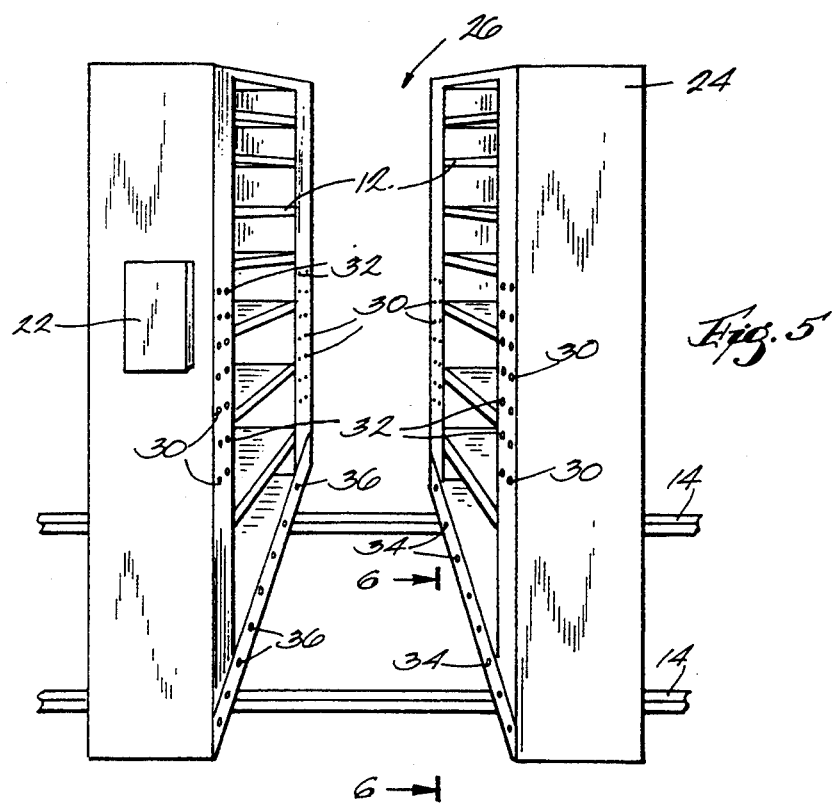
FIG. 5 is a perspective view of a mobile storage system including a directional detector constructed according to a different embodiment of the invention, wherein there are multiple light source-detector pairs mounted vertically in two columns on both sides of the aisle entry point.

Referring now to FIG. 1, there is shown a mobile storage unit 10, including several shelves 12. The storage unit 10 is moved along a set of rails 14 by a prime mover 16, such as an electric motor 18 connected to a drive wheel 20 which runs along at least one of the rails. A control unit 22 is provided for determining the rate and direction of movement of the motor 18 and drive wheel 20, and also for determining whether it is safe for the storage unit 10 to move at all.

The limit of movement of the mobile storage unit 10 is a blocking object 24, such as a second mobile storage unit as shown in FIG. 1. The blocking object 24 could just as easily be a stationary storage unit, or a blank wall, at the end of the row of mobile storage units. When the mobile storage unit 10 is spaced apart from the blocking object 24, as shown in FIG. 1, there is considered to be an aisle 26 between the two. As indicated earlier, it is conventional for any safety sweep and/or safety floor (not shown) to be connected to the control unit 22, so as to provide information to make the determination of whether it is safe to move, that is, whether there is any substantial obstacle in the aisle 26, or in the path of movement of the mobile storage unit 10, because of which the mobile storage unit should be prevented from moving. The present invention calls for that determination to be made in a different manner.

According to the present invention, two light source-detector pairs 28 and 30 are mounted to the mobile storage unit 10 and the blocking object 24. As shown in more detail in FIG. 2, each source-detector pair includes a light source 28a and 30a, such as an infrared light emitting diode, mounted to one side of the aisle, whether that be to the movable unit 10 or the blocking object 24. Each source-detector pair 28, 30 also includes a light detector 28b, 30b such as an amplified-photodiode assembly, mounted across the aisle from and sight-aligned with the corresponding sources 28a, 30a. The light detectors 28b, 30b are most preferably sensitive to the particular type of light emitted by the sources 28a, 30a, although there are also instances where it is advantageous to use ambient light as the source. As shown in FIG. 2, a light source 28a and a light detector 30b may be mounted together in a housing 32 on one side of the entry-exit point of the aisle, with the corresponding detector 28b and source 30a mounted on the opposite side of the entry-exit point of the aisle, in a housing 33 of substantially the same construction as housing 32. Just as well, there could be two sources on one side of the aisle and two detectors, one aligned with each source, on the opposite side of the aisle, all mounted in respective housings.

The important point is that the two source-detector pairs are spaced apart slightly, substantially horizontally with respect to each other. This orientation is indicated by the fact that FIG. 2 is designated a top cross sectional view. As also shown in FIG. 2, the sources 28a, 30a and detectors 28b, 30b are preferably mounted in a recessed manner, to protect them from damage, to improve ease of manufacturing and assembly, and to reduce interference from spurious light sources.

The horizontal orientation of the source-detector pairs produces the desirable result that they then provide reliable information on the direction of movement of any object between them as shown in FIG. 3, that is, whether that movement is into the aisle 26 or out of the aisle.

One embodiment of the invention further includes several in-aisle light sources 34 mounted to either the mobile storage unit 10 or the blocking object 24, directing light across the aisle 26 toward the other of the mobile storage unit and blocking object. In FIGS. 1 and 4 those in-aisle light sources 34 are mounted to the blocking object 24. Several in-aisle light detectors 36 are then mounted opposite the corresponding in-aisle light sources 34. In FIGS. 1 and 4 those detectors 36 are mounted to the mobile storage unit 10. The detectors 36 are connected to the control unit 22 so that, if any one of the detectors is screened from receiving light from any of the light sources, the control unit 22 also prevents the prime mover from moving the storage unit 10. The control unit 22 also includes circuitry or discerning means to determine which of the in-aisle detectors 36 is not receiving light from the in-aisle light sources 34.

The still detection provided by the in-aisle light detectors 36 is in addition to the directional sensing provided by the entry-exit source-detector pairs 28, since it is possible that two persons or obstacles could enter substantially at once, so that the entry-exit source-detector pairs only indicate one entry, and then one of the obstacles exits the aisle 26, leaving behind the other obstacle.

As shown in FIGS. 1 and 2, the in-aisle light sources 34 and in-aisle light detectors 36 are preferably mounted near the bottom of the mobile storage unit 10 and blocking object 24. This position was selected so that the beam 38 of light from the light sources 34 is broken or screened by the lowest part of a person's body, the lower leg 34 or foot 42 (FIG. 2), and the lowest part of an obstacle of any other type. This positioning was selected of course because of the ubiquitous influence of gravity. That is, if an obstacle has fallen off a shelf, it will normally come to rest on the floor, and may not be detected if the light sources and detectors are not located near the floor. A person's weight will normally be borne by the floor when that person is in the aisle. The floor is simply the lowest plane for supporting any potential obstacle. On the other hand, the entry-exit source-detector pairs 28 are most preferably positioned somewhat higher, between knee height and end-of-arm height, so as to give the most reliable directional indication. Horizontally, the in-aisle light sources 34 and light detectors 36 are preferably placed every twelve to eighteen inches along the length of the blocking object 24 and movable storage unit 10, respectively.

Figure 6:
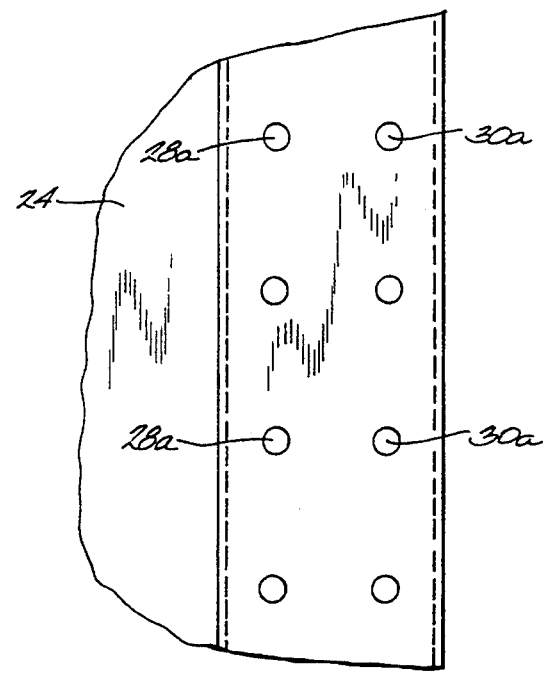
FIG. 6 is a view of FIG. 5, taken substantially along line 6—6 thereof, in effect a front elevational view of the multiple entry-exit pairs mounted in two columns.

Another embodiment of the invention is shown in FIGS. 5 and 6. In this embodiment an array 44 of light source-detector pairs are mounted to the mobile storage unit 10 and the blocking object 24, positioned at the entry point to the aisle 26. As with the entry-exit source-detector pairs 28, 30 shown in FIGS. 1 through 4, the source and detector of each pair are mounted to opposite sides of the aisle, and sight-aligned with each other. In this embodiment, the source-detector pairs are arranged in two substantially parallel substantially vertical columns. As with the embodiment shown in FIGS. 1 through 4, in this embodiment the detectors of each source detector pair are connected to the control unit 22, permitting the control unit to determine when an obstacle enters the aisle, and when an obstacle exits the aisle. This arrangement has the effect of providing a "curtain" of light sources and detectors, improving further the reliability of the directional detection of movement into and out of the aisle, and resulting in the ability to count persons or obstacles entering or leaving the aisle. In this embodiment the control unit 22 includes corresponding programming to keep track of how many persons (or other obstacles) have entered the aisle, and how many of those persons or obstacles have left the aisle. That way, the control unit 22 will refuse to close the aisle if there are still persons or obstacles in the aisle.

Accordingly, the invention provides improved functionality over prior art sweeps and safety floors, even the photoelectric sweep disclosed in U.S. Pat. No. 5,121,975, referred to above.

While the apparatus hereinbefore described is effectively adapted to fulfill the aforesaid objects, it is to be understood that the invention is not intended to be limited to the specific preferred embodiment of bi-directional motion sensor for mobile storage systems set forth above. Rather, it is to be taken as including all reasonable equivalents within the scope of the following claims.

We claim:

1. In a mobile storage system including at least a first movable storage unit with a prime mover adapted to move the shelving unit along a path of movement, and at least one blocking object, such as a second movable storage unit, stationary storage unit or wall positioned on the path, a detector for detecting the entry of an obstacle into the path of movement and the exiting of an obstacle from the path of movement, that detector comprising:

two light source-detector pairs, each including a light source and a light detector, the source and detector of each pair being mounted opposing and sight-aligned, one of each pair mounted to one of the first unit and the blocking object, and the other of each pair mounted to the other of the first unit and the blocking object;

those light source-detector pairs being spaced apart at least horizontally and positioned so that each light detector receives light from the opposing light source when an obstacle is not positioned therebetween, thereby providing reliable information on the direction of movement of the obstacle between the sources and detectors; and a control unit connected to the light detectors and receiving a signal from each light detector, that signal indicating whether or not the light detectors is receiving light from one of the light sources, the control unit disabling the prime mover from moving the movable shelving unit along the path when the control unit determines that an obstacle has entered the path and has not yet left the path.

2. The combination of claim 1 wherein the path of movement between the first unit and the blocking object when they are separated forms an aisle, those light source-detector pairs being mounted such that the light from the light sources passes across an entry point of the aisle.

3. The combination of claim 2 wherein the two source-detector pairs are substantially horizontally aligned.

4. The combination of claim 3 further comprising a plurality of in-aisle light sources mounted to one of the first unit and the blocking object, and a corresponding number of in-aisle light detectors mounted to the other of the first unit and the blocking object, the in-aisle light sources and light detectors positioned so that the in-aisle light detectors are likely to be blocked by an obstacle existing in the aisle.

5. The combination of claim 4 wherein the in-aisle light sources and light detectors are mounted substantially at the bottom of the first unit and the blocking object.

6. The combination of claim 5 wherein said control unit includes discerning means for determining which of the in-aisle light detectors if any is not receiving light from the light sources.

7. The combination of claim 6 wherein the discerning means uses the information about which of the in-aisle light detectors is not receiving light to determine where along the aisle the light detectors are not receiving light.

8. The combination of claim 1 wherein the light sources transmit infrared light.

9. A mobile storage system comprising:

at least a first movable storage unit;

a prime mover adapted to move the storage unit along a path of movement;

at least one blocking object, such as a second movable storage unit, stationary storage unit or wall, positioned on the path;

two light source-detector pairs, each including a light source and a light detector, one of each pair mounted to one of the first unit and the blocking object, and the other of each pair mounted to other of the first unit and the blocking object, the two source-detector pairs laterally spaced apart from each other;

those light source-detector pairs positioned on the first unit and blocking object so that each light detector receives light from the opposing light source when an obstacle is not positioned therebetween, so as to provide reliable information on the direction of movement of the obstacle between the sources and detectors; and a control unit connected to the light detectors and receiving a signal from each light detector, that signal indicating whether or not the light detector is receiving light from the respective light source, the control unit disabling the prime mover from moving the movable shelving unit along the path when the control unit determines that an obstacle has entered the path and has not yet left the path.

10. A mobile storage unit as recited in claim 9 wherein the path of movement between the first unit and the blocking object when they are separated forms an aisle, those light source-detector pairs being mounted such that the light from the light sources passes across an entry point of the aisle.

11. A mobile storage unit as recited in claim 10 wherein the two source-detector pairs are substantially horizontally aligned with each other.

12. A mobile storage unit as recited in claim 11 further comprising a plurality of in-aisle light sources mounted to one of the first unit and the blocking object, and a plurality of in-aisle light detectors mounted to the other of the first unit and the blocking object, the in-aisle sources and detectors positioned so that the in-aisle detectors are likely to be blocked by an obstacle existing in the aisle.

13. A mobile storage system as recited in claim 12 wherein the in-aisle detectors and sources are mounted substantially at the bottom of the first unit and blocking object.

14. The combination of claim 9 wherein the light sources transmit infrared light.

15. A mobile storage system comprising:
at least a first movable storage unit;
a prime mover adapted to move the storage unit along a path of movement;
at least one blocking object, such as a second movable storage unit, stationary storage unit or wall, positioned on the path, there being an aisle between the storage unit and the blocking object when they are spaced apart from each other;
two light source-detector pairs spaced apart at least horizontally, each pair including a source and a detector, the source and detector of each pair mounted opposing, one of each pair mounted to one of the storage unit and the blocking object, and the other of each pair mounted to the other of the storage unit and the blocking object, each light detector thus receiving light from the opposing light source when an obstacle is not positioned therebetween, thereby providing reliable information on the direction of movement of the obstacle between the sources and detector;
a control unit receiving a signal from each light detector indicating whether or not each detector is receiving light from one of the light sources, the control unit disabling the prime mover from moving the movable shelving unit along the path when the control unit determines that an obstacle has entered the aisle and has not yet exited the aisle;
a plurality of in-aisle light sources mounted to one of the first unit and the blocking object, and a plurality of in-aisle light detectors mounted to the other of the first unit and the blocking object, the in-aisle light sources and light detectors positioned so that the in-aisle light detectors are likely to be blocked by an obstacle existing in the aisle;
the control unit including discerning means for determining which of the in-aisle light detectors if any is not receiving light from the in-aisle light sources.

16. A mobile storage system as recited in claim 15 wherein the discerning means uses the information about which of the in-aisle light detectors is not receiving light to determine where along the aisle the in-aisle light detectors if any are not receiving light from the in-aisle light sources.

17. A mobile storage system as recited in claim 15 wherein the in-aisle light detectors and light sources are mounted substantially at the bottom of the first unit and the blocking object.

18. A mobile storage system as recited in claim 15 wherein the light sources transmit an infra-red signal.

19. A mobile storage system as recited in claim 15 further comprising an array of light source-detector pairs mounted to the storage unit and the blocking object, positioned at the entry point to the aisle, the source and detector of each pair being mounted across the aisle from each other and sight-aligned, and arranged in two substantially vertical columns, each row having two sources or detectors substantially horizontally aligned.

* * * * *

UNITED STATES PATENT AND TRADEMARK OFFICE
CERTIFICATE OF CORRECTION

PATENT NO. : 5,427,444
DATED : June 27, 1995
INVENTOR(S) : Patrick J. Griesemer

It is certified that error appears in the above-identified patent and that said Letters Patent is hereby corrected as shown below:

Column 5, Line 65: "light detectors" should read — light detector —

Column 8, Line 2: "detector;" should read — detectors; —

Signed and Sealed this

Twelfth Day of September, 1995

Attest:

BRUCE LEHMAN

Attesting Officer

Commissioner of Patents and Trademarks